United States Patent
Kim et al.

(10) Patent No.: US 12,034,157 B2
(45) Date of Patent: Jul. 9, 2024

(54) SULFUR-DOPED SILICON NEGATIVE ELECTRODE MATERIAL, METHOD FOR PRODUCING SAME, LITHIUM SECONDARY BATTERY NEGATIVE ELECTRODE INCLUDING NEGATIVE ELECTRODE MATERIAL, AND LITHIUM SECONDARY BATTERY COMPRISING NEGATIVE ELECTRODE

(71) Applicants: LG CHEM, LTD., Seoul (KR); POSTECH RESEARCH AND BUSINESS DEVELOPMENT FOUNDATION, Pohang-si (KR)

(72) Inventors: Jangbae Kim, Daejeon (KR); Soojin Park, Pohang-si (KR); Jaegeon Ryu, Pohang-si (KR); Jonghyun Chae, Daejeon (KR); Jihye Yang, Daejeon (KR)

(73) Assignees: LG ENERGY SOLUTION, LTD., Seoul (KR); POSTECH RESEARCH AND BUSINESS DEVELOPMENT FOUNDATION, Pohang-si (KR)

(*) Notice: Subject to any disclaimer, the term of this patent is extended or adjusted under 35 U.S.C. 154(b) by 586 days.

(21) Appl. No.: 17/285,316

(22) PCT Filed: Mar. 6, 2020

(86) PCT No.: PCT/KR2020/003204
§ 371 (c)(1),
(2) Date: Apr. 14, 2021

(87) PCT Pub. No.: WO2020/184917
PCT Pub. Date: Sep. 17, 2020

(65) Prior Publication Data
US 2021/0328214 A1 Oct. 21, 2021

(30) Foreign Application Priority Data

Mar. 8, 2019 (KR) .................. 10-2019-0027137
Mar. 6, 2020 (KR) .................. 10-2020-0028206

(51) Int. Cl.
*H01M 4/00* (2006.01)
*C01B 33/023* (2006.01)
(Continued)

(52) U.S. Cl.
CPC .......... *H01M 4/386* (2013.01); *C01B 33/023* (2013.01); *H01M 4/134* (2013.01);
(Continued)

(58) Field of Classification Search
CPC .. H01M 4/386; H01M 4/134; H01M 10/0525; H01M 2004/021;
(Continued)

(56) References Cited

U.S. PATENT DOCUMENTS

| 6,506,321 B1 | 1/2003 | Yamashita et al. |
| 11,223,036 B2 * | 1/2022 | Liu ........................ H01M 4/134 |

(Continued)

FOREIGN PATENT DOCUMENTS

| CN | 1280707 A | 1/2001 |
| CN | 103594690 A | 2/2014 |

(Continued)

OTHER PUBLICATIONS

Machine translation of CN-107768618-A, obtained Oct. 2023 (Year: 2018).*

(Continued)

*Primary Examiner* — Nicholas P D'Aniello
(74) *Attorney, Agent, or Firm* — Birch, Stewart, Kolasch & Birch, LLP (57) ABSTRACT

A sulfur-doped silicon negative electrode material, a preparation method for a sulfur-doped silicon negative electrode
(Continued)

material, a negative electrode for a lithium secondary battery comprising the sulfur-doped silicon negative electrode material, and a lithium secondary battery comprising the negative electrode, wherein the sulfur-doped silicon negative electrode material has an internal pore channel having an average width of 500 nm to 3 μm and an average external diameter of 1 μm to 5 μm.

15 Claims, 10 Drawing Sheets

(51) Int. Cl.
  *H01M 4/134* (2010.01)
  *H01M 4/38* (2006.01)
  *H01M 4/02* (2006.01)
  *H01M 10/0525* (2010.01)

(52) U.S. Cl.
  CPC ...... *C01P 2002/54* (2013.01); *C01P 2002/72* (2013.01); *C01P 2004/03* (2013.01); *C01P 2004/04* (2013.01); *C01P 2006/16* (2013.01); *C01P 2006/40* (2013.01); *H01M 2004/021* (2013.01); *H01M 2004/027* (2013.01); *H01M 10/0525* (2013.01)

(58) Field of Classification Search
  CPC .......... H01M 2004/027; H01M 10/052; C01B 33/023; C01B 33/02; C01P 2002/54; C01P 2002/72; C01P 2004/03; C01P 2004/04; C01P 2006/16; C01P 2006/40; C01P 2004/61; C01P 2002/52; Y02E 60/10
  See application file for complete search history.

(56) References Cited

U.S. PATENT DOCUMENTS

| | | |
|---|---|---|
| 2012/0100438 A1 | 4/2012 | Fasching et al. |
| 2014/0050987 A1 | 2/2014 | Park et al. |
| 2014/0377643 A1 | 12/2014 | Lee et al. |
| 2015/0140426 A1 | 5/2015 | Park et al. |
| 2015/0188126 A1 | 7/2015 | Kang et al. |
| 2017/0309902 A1 | 10/2017 | Jo et al. |
| 2018/0151874 A1 | 5/2018 | Kim et al. |

FOREIGN PATENT DOCUMENTS

| | | |
|---|---|---|
| CN | 107112519 A | 8/2017 |
| CN | 107579233 A | 1/2018 |
| CN | 107628622 A | 1/2018 |
| CN | 107636867 A | 1/2018 |
| CN | 107768818 A | 3/2018 |
| CN | 108400294 A | 8/2018 |
| EP | 1 039 557 A1 | 9/2000 |
| JP | 2011-162360 A | 8/2011 |
| JP | 2013-545228 A | 12/2013 |
| KR | 10-2013-0139555 A | 12/2013 |
| KR | 10-1396489 B1 | 5/2014 |
| KR | 10-2014-0141488 A | 12/2014 |
| KR | 10-2016-0142788 A | 12/2016 |
| KR | 10-2018-0066358 A | 6/2018 |
| WO | WO 2014/042485 A1 | 3/2014 |

OTHER PUBLICATIONS

Yue et al. "Porous Si coated with S-doped carbon as anode material for lithium ion batteries" J Solid State Electrochem (2013) 17: 961-968 (Year: 2012).*
Astrov et al., "Planar sulfur-doped silicon detectors for high-speed infrared thermography", Infrared Physics & Technology, vol. 52, No. 1, 2009, pp. 25-31.
International Search Report issued in PCT/KR2020/003204 (PCT/ISA/210), dated Jun. 16, 2020.
Lin et al., "A Low Temperature Molten Salt Process for Aluminothermic reduction of Silicon Oxides to Crystalline Si for Li-ion Batteries", Energy & Environmental Science, vol. 8, No. 11, 2015, pp. 3187-3191.
Ryu et al., "Infinitesimal sulfur fusion yields quasi-metallic bulk silicon for stable and fast energy storage", Nature Communications, vol. 10, No. 1, 2019, pp. 1-9.
Shao et al., "Novel core-shell structured Si/S-doped-carbon composite with buffering voids as high performance anode for Li-ion batteries", RSC Advances, vol. 7, 2017, pp. 2407-2414.
Song et al., "Revealing salt-expedited reduction mechanism for hollow silicon microsphere formation in bi-functional halide melts", Communications Chemistry, vol. 1, No. 42, 2018, pp. 1-10.
Zhou et al., "Aluminothermic reduction enabled synthesis of silicon hollow microspheres from commercialized silica nanoparticles for superior lithium storage", Chemical Communications, vol. 52, No. 54, 2016, pp. 8401-8404.
Extended European Search Report for European Application No. 20769215.3, date Oct. 29, 2021.
Gao et al., "Formation of Si Hollow Structures as Promising Anode Materials through Reduction of Silica in AlCl3—NaCl Molten Salt", ACS Nano, vol. 12, No. 11, Nov. 5, 2018, pp. 11481-11490.
LV et al., "Simultaneous Perforation and Doping of Si Nanoparticles for Lithium-Ion Battery Anode", Applied Materials & Interfaces, vol. 9, No. 51, Dec. 6, 2017, pp. 44452-44457.

* cited by examiner

SULFUR-DOPED SILICON NEGATIVE ELECTRODE MATERIAL, METHOD FOR PRODUCING SAME, LITHIUM SECONDARY BATTERY NEGATIVE ELECTRODE INCLUDING NEGATIVE ELECTRODE MATERIAL, AND LITHIUM SECONDARY BATTERY COMPRISING NEGATIVE ELECTRODE

TECHNICAL FIELD

This application claims the benefits of priorities based on Korean Patent Application No. 10-2019-0027137 filed on Mar. 8, 2019 and Korean Patent Application No. 10-2020-0028206 filed on Mar. 6, 2020, the entire contents of which are incorporated herein by reference.

The present invention relates to a sulfur-doped silicon negative electrode material, a preparation method thereof, a negative electrode for a lithium secondary battery comprising the negative electrode material, and a lithium secondary battery comprising the negative electrode.

BACKGROUND ART

The market for secondary batteries is expanding to various ranges of batteries for portable electronic devices and telecommunication devices, ultra-small batteries such as batteries for insertion into the human body, medium and large-sized batteries such as hybrid electric vehicles (HEV/PHEV) or electric vehicles (EV), large batteries for storage of energy from the power generation system and the like.

The existing carbon-based active material, commercialized as a negative electrode active material for lithium secondary batteries, has excellent properties as an active material for batteries, but has a limited theoretical capacity of 372 mAh/g, which is not suitable to meet the needs of this field for high energy density.

Therefore, in order to solve the shortcomings of the carbon-based active material, development of non-carbon negative electrode materials has been steadily performed. Among them, since silicon (Si) has a high discharge capacity of 4200 mAh/g, as well as a very low lithium reaction potential of 0.4 V (Li/Li$^+$), it is promising as an alternative negative electrode material. However, the silicon negative electrode material has the disadvantage of causing an electrical short circuit due to volume expansion generated during charging, or rapidly deteriorating the life characteristics of the battery by increasing the electrolyte decomposition reaction through the creation of a new surface. In addition, it has the disadvantage that it is not suitable for fast charging purposes due to low electronic conductivity and low lithium ion diffusivity.

In order to improve the properties of the silicon negative electrode material, various attempts (top-down, bottom-up or boron/nitrogen doping) such as the production of Si/C composites have been made, but the silicon negative electrode material is in a situation of having difficulty in commercialization, since it is prepared by a complicated preparation process, is unsuitable for commercialization, and exhibits low electrochemical characteristics (especially charging characteristics).

PRIOR ART DOCUMENT

Patent Document

PCT Publication No. WO2014042485A1

DISCLOSURE

Technical Problem

As a result of much efforts to solve the problems of the prior art as described above, the inventors of the present invention have discovered a method of very efficiently preparing sulfur-doped silicon having excellent properties as a negative electrode material by low temperature reduction reaction, and thus have completed the present invention.

Therefore, it is an object of the present invention to provide a method of preparing a sulfur-doped silicon negative electrode material that can efficiently manufacture a sulfur-doped silicon negative electrode material having a porous structure, excellent electron conductivity, and ion conductivity.

In addition, it is another object of the present invention to provide a sulfur-doped silicon negative electrode material which has a porous structure, thereby alleviating the large volume expansion of silicon, and is excellent in electronic conductivity and ionic conductivity, and provides excellent initial charging/discharging characteristics, charging/discharging lifetime characteristics, and charging/discharging characteristics according to C-rate.

In addition, it is still another object of the present invention to provide a negative electrode comprising the sulfur-doped silicon negative electrode material and a lithium secondary battery comprising the negative electrode.

Technical Solution

In order to achieve the above objects, the present invention provides a sulfur-doped silicon negative electrode material which has an internal pore channel having an average width of 500 nm to 3 µm and has an average external diameter of 1 µm to 5 µm.

The sulfur-doped silicon negative electrode material may be characterized in that sulfur is doped in an amount of 0.1 to 5 at %.

The sulfur-doped silicon negative electrode material may be characterized in that the electrical conductivity is 1 to 6 S/m.

The sulfur-doped silicon negative electrode material may be characterized in that the lithium ion diffusion coefficient is $10^{-12}$ to $10^{-10}$ cm$^2$/s.

The sulfur-doped silicon negative electrode material may be characterized in that the porosity is 4 to 10%.

In addition, the present invention provides a method of preparing a sulfur-doped silicon negative electrode material comprising the steps of:

(a) preparing a mixture by mixing silica, a metal reducing agent, a metal halide salt, and a sulfate compound; and (b) performing a reduction reaction on the mixture.

In addition, the present invention provides a negative electrode for a lithium secondary battery comprising the sulfur-doped silicon negative electrode material of the present invention.

In addition, the present invention provides a lithium secondary battery comprising the negative electrode for the lithium secondary battery of the present invention.

Advantageous Effects

The method of preparing the sulfur-doped silicon negative electrode material of the present invention provides an effect of manufacturing a sulfur-doped silicon negative electrode material having porous structure and excellent electronic conductivity and ionic conductivity very simply and efficiently as compared with the conventional method.

Since the sulfur-doped silicon negative electrode material of the present invention has a porous structure, it can alleviate the large volume expansion of silicon, and is excellent in electronic conductivity and ionic conductivity, and provides the battery with excellent initial charging/discharging characteristics, charging/discharging lifetime characteristics, and charging/discharging characteristics according to C-rate.

BEST MODE

Hereinafter, the present invention will be described in detail.

The present invention relates to a sulfur-doped silicon negative electrode material which has an internal pore channel having an average width of 500 nm to 3 μm and has an average external diameter of 1 μm to 5 μm.

The average diameter of the internal pore channel is preferably 1 μm to 3 μm, and more preferably 1.5 μm to 2.5 μm.

The sulfur-doped silicon negative electrode material of the present invention can be prepared by low temperature reduction reaction of the homogeneous mixture of silica, a metal reducing agent, a metal halide salt, and a sulfate compound.

According to the above preparation method, the reduction reaction is carried out near the melting point of the metal halide salt, wherein the metal reducing agent reacts with the metal halide salt to form a metal-metal halide complex (hereinafter referred to as MHC), and the MHC selectively reduces silicon and sulfur by attacking the silica having oxygen and the sulfate compound, and thus forms a small-sized silicon and sulfur seed. In addition, the molten salt creates a clustering atmosphere and agglomerates with each other to form silicon doped with micrometer-sized sulfur. Therefore, the sulfur-doped silicon negative electrode material of the present invention has a structure, in which silicon and sulfur seeds are agglomerated with each other, and has internal pore channels formed when the seeds are agglomerated with each other in a mixed state.

The sulfur-doped silicon negative electrode material of the present invention can alleviate the large volume expansion of silicon by the micrometer-sized porous structure, and enables the high-speed charging/discharging of the battery containing the same due to the improved electronic/ionic conductivity effect, and at the same time, provides a lifetime improvement effect.

In the sulfur-doped silicon negative electrode material of the present invention, the internal pore channel may have a shape formed by sulfur-doped silicon particles, and the shape of the internal pore channel may have a shape similar to, for example, a cylindrical tube. However, the shape of the internal pore channel is not limited to these shapes, and any channel formed by being surrounded by sulfur-doped silicon particles may be comprised as the internal pore channel of the present invention.

In the sulfur-doped silicon negative electrode material of the present invention, sulfur may be doped in an amount of 0.1 at % to 5 at %, and more preferably 0.3 at % to 2 at %.

If the doping amount of sulfur is less than the above range, it is difficult to expect improved electrical conductivity, and if the doping amount of sulfur exceeds the above range, it is not preferable due to the problem of sulfur loss according to the formation of excess silicon sulfide.

The sulfur-doped silicon of the present invention has greatly improved electronic conductivity, which is comparable to the level of semi-metallic (According to previous reports, when silicon is doped with sulfur to a certain level or higher, an insulator-to-metal transition occurs; Phys. Rev. Lett., 2011, 106, 178701). In addition, lithium ion conductivity is greatly improved through the internal nanochannels formed when each of the seeds is agglomerated with each other. The silicon negative electrode material with improved lithium ion conductivity by structurally forming channels was first discovered by the present invention.

The sulfur-doped silicon negative electrode material of the present invention may be characterized in that the electrical conductivity is 1 S/m to 6 S/m. In addition, it may be characterized in that the lithium ion diffusion coefficient is $10^{-12}$ cm$^2$/s to $10^{-10}$ cm$^2$/s. The sulfur-doped silicon negative electrode material of the present invention may have an electronic/ionic conductivity in the above-described range, thereby enabling high-speed charging/discharging of a battery comprising the same, and at the same time, may provide a life improvement effect.

The sulfur-doped silicon negative electrode material may have a porosity of 4% to 10%, and more preferably 5 to 8%.

In addition, the present invention relates to a method of preparing a sulfur-doped silicon negative electrode material comprising the steps of:

(a) preparing a mixture by mixing silica, a metal reducing agent, a metal halide salt, and a sulfate compound; and (b) performing a reduction reaction on the mixture.

In the preparation method of the present invention, in step (a), the silica, the metal reducing agent, the metal halide salt, and the sulfate compound may be mixed in a weight ratio of 5-14:12-14:62-67:7-19, respectively.

If the amount of the silica used is outside the above-described range, there is a problem that the yield is lowered since an excess of unreduced silica remains, which is not preferable.

In addition, when the amount of the metal reducing agent used is outside the above-mentioned range, there is a problem that the reduction of the silica and sulfate compounds does not work properly, which is not preferable.

In addition, when the amount of the metal halide salt used is outside the above-mentioned range, there is a problem that the reduction of the silica and sulfate compounds does not work properly, which is not preferable.

In particular, the weight ratio of the sulfate compound may be 7 to 19 as described above, and more preferably 14 to 18.

If the weight ratio of the sulfate compound is less than 7, it is not preferable in terms of electrical conductivity, and if the weight ratio of the sulfate compound exceeds 19, it is not preferable in terms of sulfur loss due to the formation of excess silicon sulfide.

In the preparation method of the present invention, the reduction reaction in step (b) may be carried out by heating the mixture to a temperature in a range of 200° C. to 270° C., and more preferably 220° C. to 250° C. under an inert atmosphere. If the reduction reaction is carried out at a temperature less than the range of 200° C. to 270° C., it is not preferable because the metal halide salt is not dissolved and thus it is difficult to elicit the reduction reaction. If the reduction reaction is carried out in excess of the above-mentioned range, the pressure inside the reaction vessel is greatly increased, and the risk of explosion increases, which is not preferable.

The reduction reaction in the above may be performed for 5 to 15 hours.

According to the preparation method of the present invention, if reaction of the homogeneous mixture of the silica, the metal reducing agent, the metal halide salt, and the sulfate compound is performed near the melting point of the metal halide salt using low temperature reduction reaction, the metal reducing agent reacts with the metal halide salt to form a metal-metal halide complex (hereinafter referred to as MHC). At this time, the MHC selectively reduces sulfur by attacking the silica having oxygen and the sulfate compound, and thus forms a small-sized silicon and a sulfur seed, and the molten salt creates a clustering atmosphere and agglomerates with each other to form silicon doped with micrometer-sized sulfur.

In the preparation method of the present invention, the reduction reaction scheme of silica is illustrated as follows:

[Reaction Scheme 1]

$$3\, SiO_2 + 4\, Al + 2\, AlCl_3 \longrightarrow 3\, Si + 6\, AlOCl$$

In addition, the reduction reaction scheme of the sulfate compound as an additive is illustrated as follows:

[Reaction Scheme 2]

$$MgSO_4 + 2\, Al + 4\, AlCl_3 \longrightarrow S + MgAl_2Cl_8 + 4\, AlOCl$$

According to the preparation method of the present invention, the reaction is possible with various combinations of the metal reducing agent and the metal halide salt, and uniform doping is economically possible compared to the conventional ion-implantation method.

According to the preparation method of the present invention, the above-mentioned sulfur-doped silicon can be obtained with high purity of 90% by weight or more.

In step (a), the sulfate compound may be at least one selected from the group consisting of $MgSO_4$, $ZnSO_4$, $BaSO_4$, $Na_2SO_4$, and $NiSO_4$.

In step (a), the metal reducing agent may be at least one selected from the group consisting of Mg, Al, Ca, and Zn, and the metal halide salt may be at least one selected from the group consisting of $AlCl_3$, $MgCl_2$, and $ZnCl_2$.

After the reduction reaction of step (b) is completed, step (c) dispersing the mixture in water to remove unreacted metal halide salt and sulfate compound may be further performed.

In addition, after performing step (c), step (d) removing the metal reducing agent and the residual material by treating the mixture with an aqueous hydrochloric acid solution may be further performed.

In the preparation method of the present invention, removing unreacted silica can be carried out using 0.1% to 10% (v/v) hydrofluoric acid after performing step (b).

In addition, the present invention relates to a negative electrode for a lithium secondary battery comprising the sulfur-doped silicon negative electrode material of the present invention and a lithium secondary battery comprising the negative electrode for the lithium secondary battery.

The negative electrode and the lithium secondary battery of the present invention can be constructed and manufactured by applying known techniques, except for the feature of manufacturing a negative electrode using the sulfur-doped silicon negative electrode material, and manufacturing a lithium secondary battery using the negative electrode.

Hereinafter, the negative electrode for the lithium secondary battery and the lithium secondary battery will be described by way of example.

The lithium secondary battery of the present invention may comprise a negative electrode; a positive electrode; a separator provided between the positive electrode and the negative electrode; and an electrolyte.

The negative electrode may include the sulfur-doped silicon negative electrode material as a negative electrode active material, a binder, and an electrically conductive material, and may be manufactured by further comprising a dispersing agent.

The negative electrode active material, the binder, the electrically conductive material, and/or the dispersing agent may form a negative electrode active material layer, and the negative electrode active material layer is incorporated into the negative electrode by applying a slurry containing the components to a current collector and drying it. Here, non-limiting examples of the current collector may comprise a foil produced by copper, gold, nickel or copper alloy, or a combination thereof.

The electrically conductive material is not particularly limited, but conductive materials such as graphite-based materials such as KS6, and carbon-based materials such as Super-P, Denka black, and carbon black, or conductive polymers such as polyaniline, polythiophene, polyacetylene, and polypyrrole can be used alone or in combination.

In the lithium secondary battery of the present invention, the positive electrode may be manufactured in the form of binding the positive electrode active material to the current collector according to a conventional method known in the art.

As the positive electrode active material, a known positive electrode active material can be used, and for example, lithium manganese oxide, lithium cobalt oxide, lithium nickel oxide, lithium iron oxide, $LiNi_xMn_yCo_zO_2$ (NMC) which is a 3-component positive electrode material, or a lithium composite oxide obtained by combining them may be used. In addition, the example of the current collector may comprise a foil made of aluminum, nickel, or a combination thereof. The positive electrode may further include the dispersant of the present invention.

The separator positioned between the positive electrode and the negative electrode is one capable of separating or insulating the positive electrode and the negative electrode from each other and enabling lithium ion transport between the positive electrode and the negative electrode. The separator used in the present invention can be used as long as it is a porous polymer substrate commonly used in this field, and for example, may be a polyolefin-based porous polymer membrane or a non-woven fabric, but is not particularly limited thereto.

Examples of the polyolefin-based porous polymer membrane may comprise a membrane formed from each of polyethylenes such as high-density polyethylene, linear low-density polyethylene, low-density polyethylene, and ultra-high molecular weight polyethylene, and polyolefin-based polymers such as polyethylene, polypropylene, polybutylene, and polypentene alone or polymers obtained by mixing them.

The nonwoven fabric may comprise, in addition to polyolefin-based nonwoven fabrics, nonwoven fabrics formed from each of polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, polyethylene naphthalate and the like alone or polymers obtained by mixing them. The structure of the nonwoven fabric may be a spunbond nonwoven fabric or a melt blown nonwoven fabric composed of long fibers.

The thickness of the porous polymer substrate is not particularly limited, but may be 5 μm to 50 μm, and the pore size and porosity present in the porous polymer substrate are also not particularly limited, may be 0.01 μm to 50 μm and 10 to 95%, respectively.

In addition, in order to improve the mechanical strength of the separator and to improve the safety of the lithium secondary battery, a porous coating layer containing inorganic particles and a polymer binder may be further comprised on at least one surface of the porous polymer substrate.

As the electrolyte, those known in the art may be used, and for example, a non-aqueous electrolyte solution may be used. The non-aqueous electrolyte solution may include a lithium salt as an electrolyte salt. As the lithium salt, those commonly used in an electrolyte solution for a lithium secondary battery can be used without limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

As the organic solvent contained in the non-aqueous electrolyte solution, the organic solvents commonly used in the electrolyte solution for the lithium secondary battery may be used without limitation, and for example, ethers, esters, amides, linear carbonates, cyclic carbonates, etc. may be used alone or in combination of two or more thereof. Among them, carbonate compounds which are representatively cyclic carbonates, linear carbonates, or a mixture thereof may be used.

The injection of the non-aqueous electrolyte solution can be performed at an appropriate stage of the manufacturing process of the lithium secondary battery depending on the manufacturing process and required properties of the final product. That is, it can be applied before assembling the lithium secondary battery or in the final stage of assembling the lithium secondary battery.

The lithium secondary battery may be configured by applying techniques known in this field, except for the characteristic technique of the present invention described above.

In the case of the lithium secondary battery according to the present invention, it is possible to perform stacking or laminating process, folding process, and stacking/folding process of the separator and the electrode, in addition to the winding process which is a general process.

In addition, the appearance of the lithium secondary battery is not particularly limited, but can be cylindrical type, square type, pouch type, coin type or the like using cans.

Hereinafter, preferred examples of the present invention will be described in order to facilitate understanding of the present invention. It will be apparent to those skilled in the art, however, that the following examples are illustrative of the present invention and that various changes and modifications can be made within the scope and spirit of the present invention, and also it is natural that such variations and modifications are within the scope of the appended claims.

EXAMPLE 1

Preparation of Sulfur-Doped Silicon (Semi-Metallic Silicon) Negative Electrode Material 1 g of silica, 3 g of magnesium sulfate, 2 g of aluminum metal, and 10 g of aluminum chloride salt were uniformly mixed in a glove box using a mortar. After the uniformly mixed mixture was placed in a reaction vessel, the reduction reaction was performed by heating it in an argon atmosphere at 250° C. for 10 hours.

The semi-metallic silicon after the completion of the reduction reaction was dispersed in 200 mL of water to react, and the remaining magnesium sulfate and aluminum chloride were first dissolved out, and then semi-metallic silicon was obtained through a vacuum filter.

Next, the semi-metallic silicon was put in 200 mL of 0.5 M hydrochloric acid and mixed at 35° C. for 3 hours, and the remaining aluminum metal and other foreign matter were removed.

Removal of the remaining silica after the reaction was carried out by mixing semi-metallic silicon in 0.1 to 5% (v/v) hydrofluoric acid for 5 to 30 minutes. Semi-metallic silicon was finally obtained through a vacuum filter.

COMPARATIVE EXAMPLE 1

Preparation of Silicon Negative Electrode Material

A silicon negative electrode material was prepared in the same manner as in Example 1, except that magnesium sulfate was not added as an additive in Example 1.

Experimental Example 1

Evaluation of the Morphology of Sulfur-Doped Silicon (Semi-Metallic Silicon) Negative Electrode Material or Silicon Negative Electrode Material In order to confirm the structure of the sulfur-doped silicon (semi-metallic silicon) negative electrode material of the present invention, the morphology of silica, sulfur-doped silicon (semi-metal silicon) prepared in Example 1 and silicon prepared in Comparative Example 1 were photographed and compared (FIGS. 1 to 4) using a scanning electron microscope (SEM) and a transmission electron microscope (TEM), and the diameter of the internal pore channel was measured. As a result of the measurement, it was confirmed that the internal pore channel had an average width of 500 nm to 3 µm.

Figure 5:
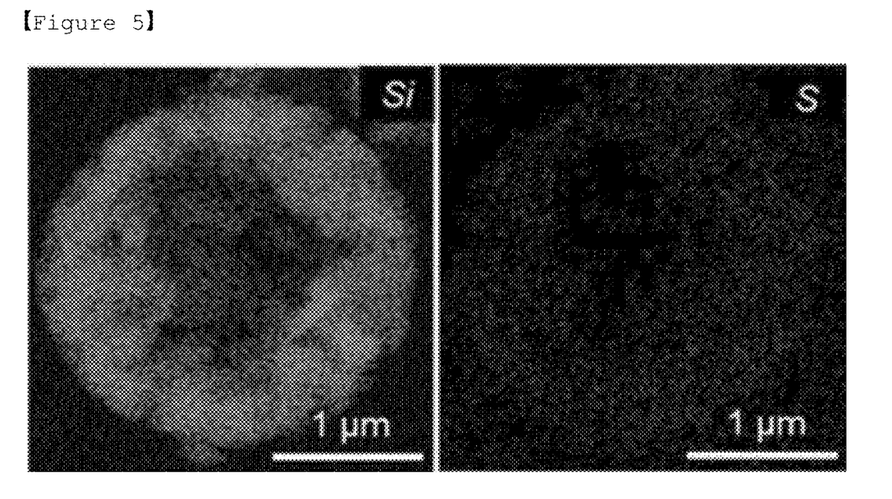
FIG. 5 shows an elemental mapping image by energy dispersive spectroscopy (EDS) of the sulfur-doped silicon prepared in Example 1.

In addition, an elemental mapping image was taken by energy dispersive spectroscopy (EDS) for sulfur-doped silicon (semi-metallic silicon) prepared in Example 1 (FIG. 5).

Figure 1:
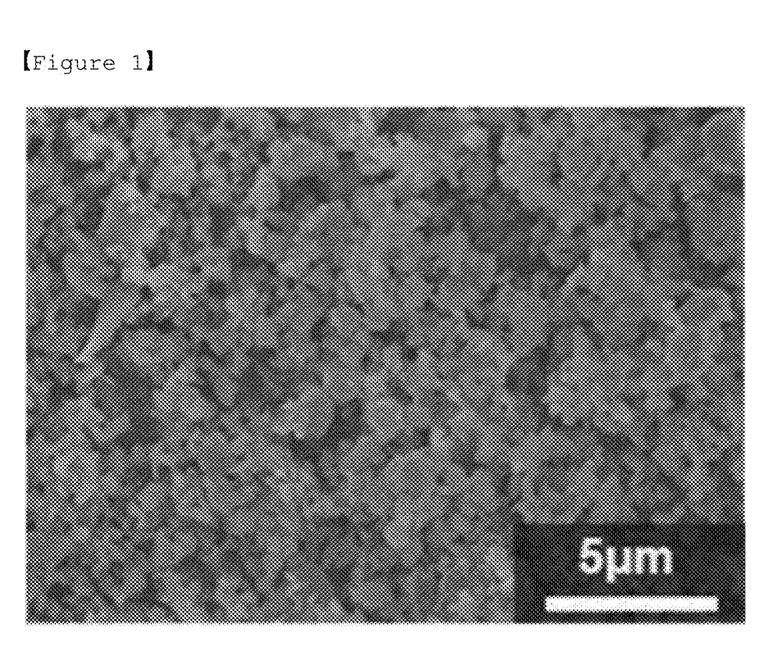
FIG. 1 shows a scanning electron microscope (SEM) image of silica.
Figure 2:
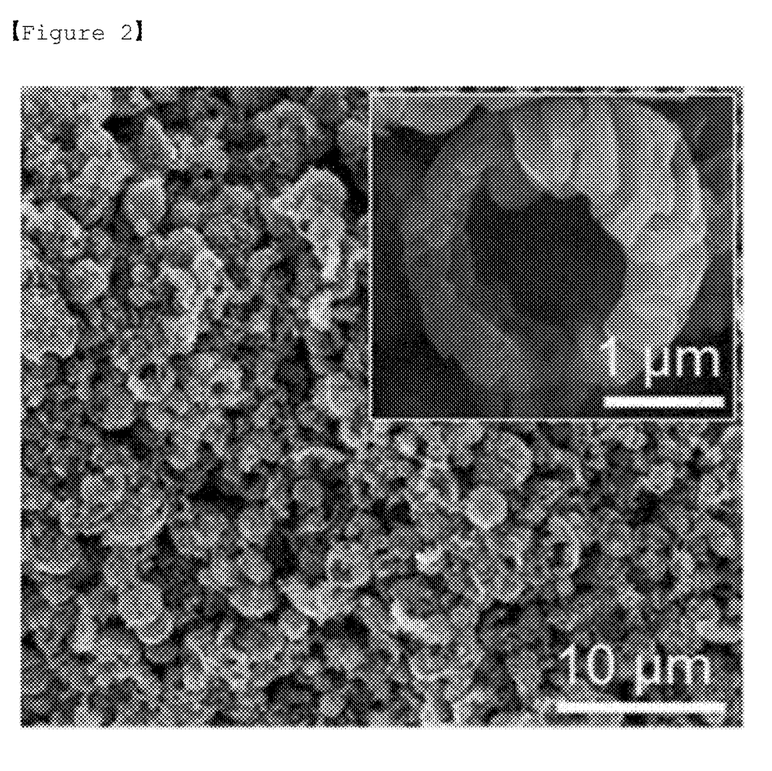
FIG. 2 shows a scanning electron microscope (SEM) image of the sulfur-doped silicon prepared in Example 1.
Figure 3:
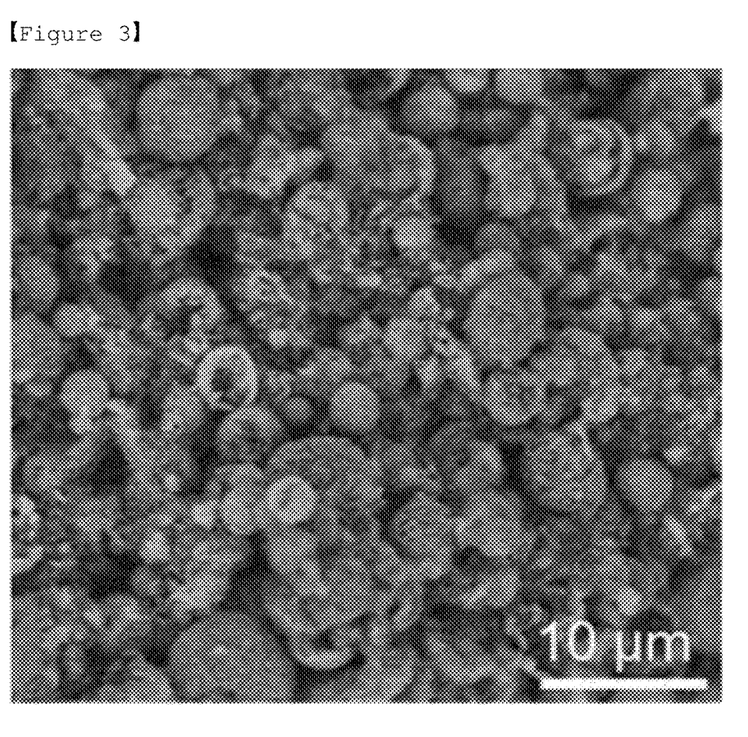
FIG. 3 shows a scanning electron microscope (SEM) image of the silicon prepared in Comparative Example 1.

Specifically, FIG. 1 shows a scanning electron microscope (SEM) image of silica, FIG. 2 shows a scanning electron microscope (SEM) image of the sulfur-doped silicon prepared in Example 1, and FIG. 3 shows a scanning electron microscope (SEM) image of the silicon prepared in Comparative Example 1.

Figure 4:
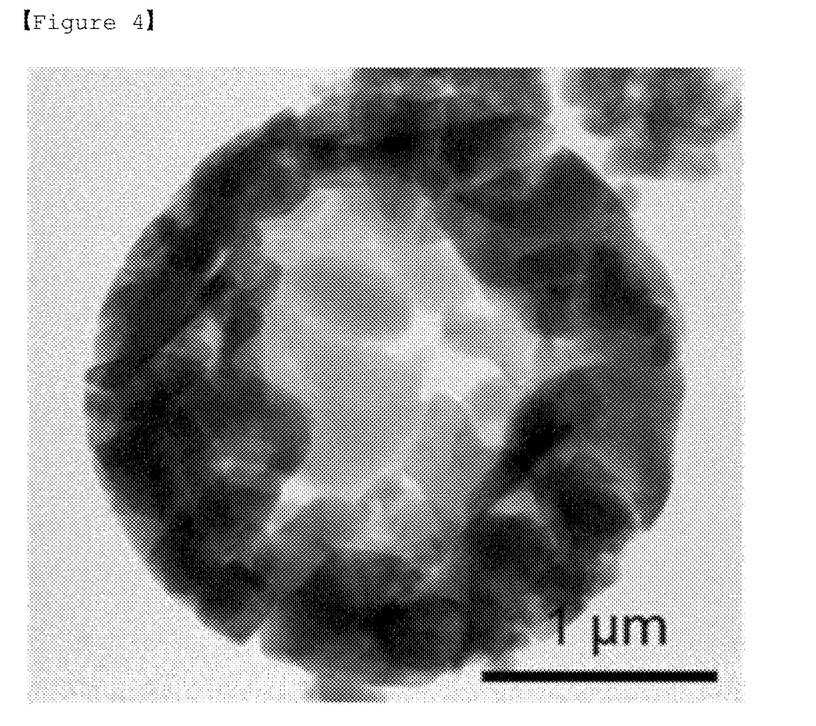
FIG. 4 shows a transmission electron microscope (TEM) image of the sulfur-doped silicon prepared in Example 1.
Figure 6:
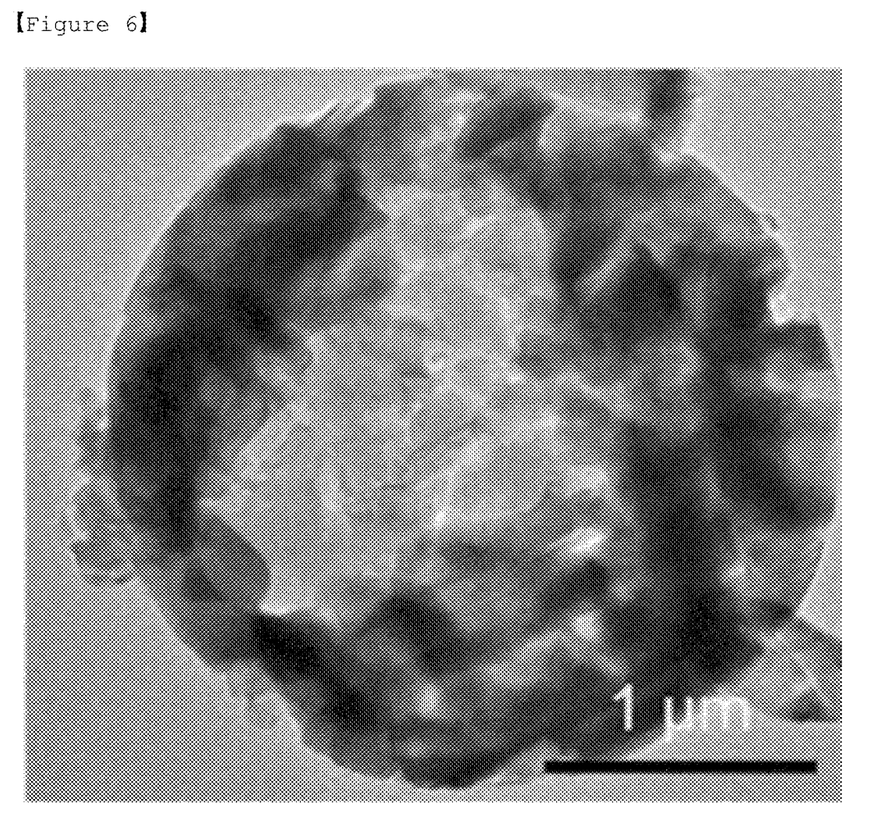
FIG. 6 shows a transmission electron microscope (TEM) image of the silicon prepared in Comparative Example 1.

FIG. 4 shows a transmission electron microscope (TEM) image of the sulfur-doped silicon prepared in Example 1, FIG. 5 shows an elemental mapping image by energy dispersive spectroscopy (EDS) of the sulfur-doped silicon prepared in Example 1, and FIG. 6 shows a transmission electron microscope (TEM) image of the silicon prepared in Comparative Example 1.

It was confirmed from FIGS. 1 to 6 that the sulfur-doped silicon (semi-metallic silicon) negative electrode material of the present invention has a structure distinctly different from that of Comparative Example 1.

Experimental Example 2

Figure 7:
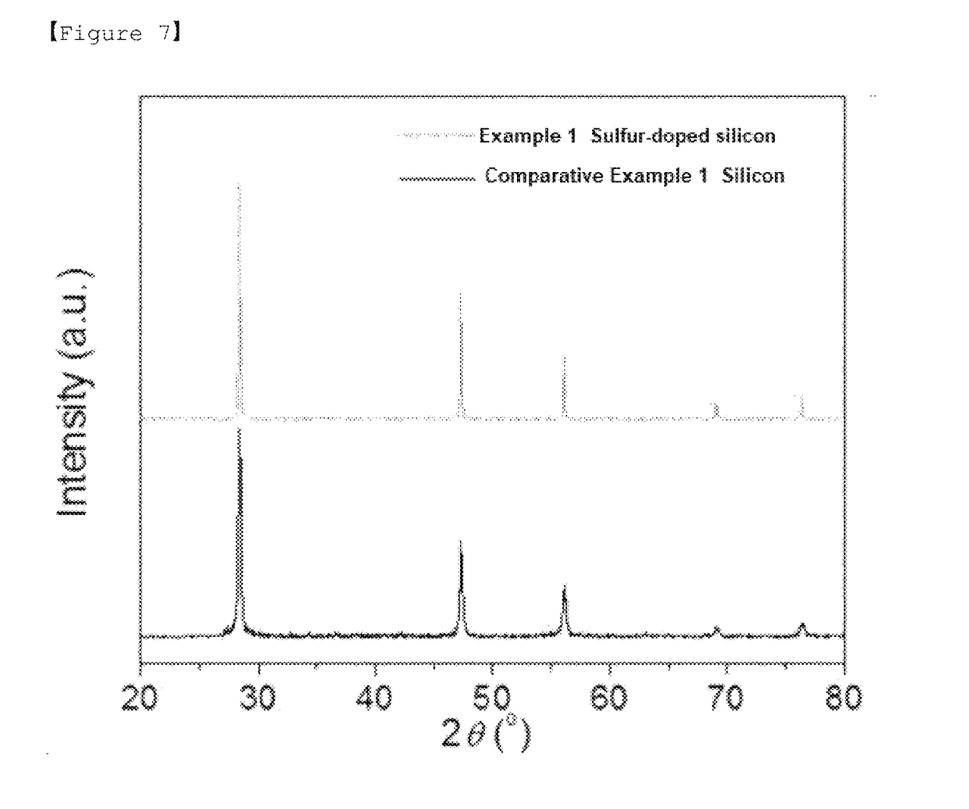
FIG. 7 is XRD pattern graphs of the sulfur-doped silicon (semi-metallic silicon) prepared in Example 1 and the silicon prepared in Comparative Example 1.

Evaluation of Physical Properties of Sulfur-Doped Silicon (Semi-Metallic Silicon) Negative Electrode Material or Silicon Negative Electrode Material (1) Evaluation of Crystallization The XRD patterns of the sulfur-doped silicon (semi-metallic silicon) prepared in Example 1 and the silicon prepared in Comparative Example 1 were measured by X-ray diffraction analysis using an X-ray diffractometer (Brucker, D8 ADVANCE) device, and the results are shown in FIG. 7.

As can be seen from the XRD pattern graph of FIG. 7, it can be seen that the sulfur-doped silicon (semi-metallic silicon) prepared in Example 1 of the present invention and the silicon prepared in Comparative Example 1 both have crystalline silicon properties.

(2) Evaluation of Electrical Conductivity

Figure 8:
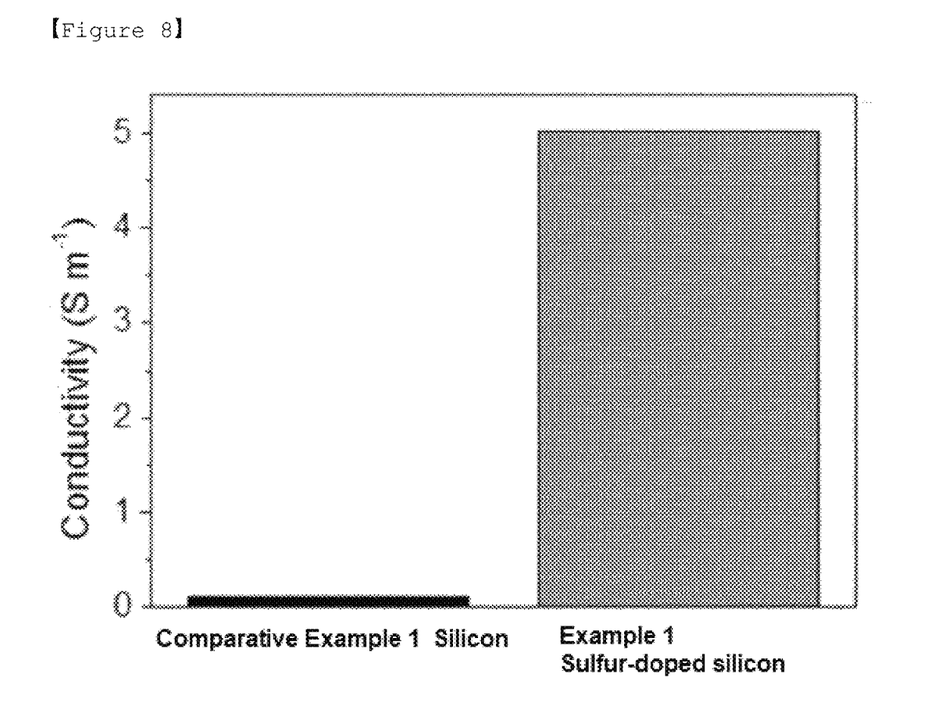
FIG. 8 is comparison graphs of the electrical conductivities of the sulfur-doped silicon (semi-metallic silicon) prepared in Example 1 and the silicon prepared in Comparative Example 1.

The electrical conductivity of the sulfur-doped silicon (semi-metallic silicon) prepared in Example 1 and the silicon prepared in Comparative Example 1 was measured by voltage sweep method using a Keithley Soure Measure Unit (Keithley, SMU 2400) device, and the results are shown in FIG. 8.

As can be seen from FIG. 8, the sulfur-doped silicon (semi-metallic silicon) prepared in Example 1 of the present invention exhibited significantly superior electrical conductivity compared to the silicon prepared in Comparative Example 1.

EXAMPLE 2

Preparation of Negative Electrode Using Sulfur-Doped Silicon (Semi-Metallic Silicon) Negative Electrode Material A slurry composition for formation of a negative electrode was prepared by mixing 1 g of the sulfur-doped silicon (semi-metallic silicon) negative electrode material prepared in above Example 1 as a negative electrode active material, 0.05 g of a PAA (manufacturer: Sigma Aldrich) binder, 0.05 g of CMC (manufacturer: Sigma Aldrich) binder, and 0.1 g of Super P and dispersing it in a water solvent.

A negative electrode was prepared by applying the slurry composition prepared above to a copper foil and drying it.

Comparative Example 2

Preparation of Negative Electrode Using Silicon Negative Electrode Material

A negative electrode was prepared in the same manner as in Example 2, except that the silicon negative electrode material prepared in Comparative Example 1 instead of the sulfur-doped silicon (semi-metallic silicon) negative electrode material prepared in Example 1 is used in Example 2.

EXAMPLE 3

Preparation of Lithium Secondary Battery

The negative electrode prepared in Example 2 was punched out according to the size of the coin cell, and a coin cell battery was prepared using the negative electrode as a negative electrode.

In a glove box with an argon atmosphere, the negative electrode, a separator (polypropylene), a lithium metal foil counter electrode, a gasket, a stainless steel coin, a spring, and a stainless steel top plate are placed on the bottom plate of stainless steel in order, and pressurized to assemble a coin cell.

The electrolyte solution is a mixture solution of ethylene carbonate (EC) and diethyl carbonate (DEC) in which 1.3 M $LiPF_6$ 10 wt. % of fluoroethylene carbonate (FEC) is dissolved, and the mixed solution was injected onto the punched positive electrode.

COMPARATIVE EXAMPLE 3

Preparation of Lithium Secondary Battery

A three-electrode cell was prepared in the same manner as in Example 3, except that the negative electrode prepared in Comparative Example 2 was used.

EXPERIMENTAL EXAMPLE 3

Evaluation of the Initial Charging/Discharging Characteristics of the Battery, Charging/Discharging Life Characteristics, and Charging/Discharging Characteristics According to C-Rate of the Battery The relative capacity and area capacity of each battery were evaluated using the batteries prepared in Example 3 and Comparative Example 3 as follows.

(1) Evaluation of Initial Charging/Discharging Characteristics

Figure 9:
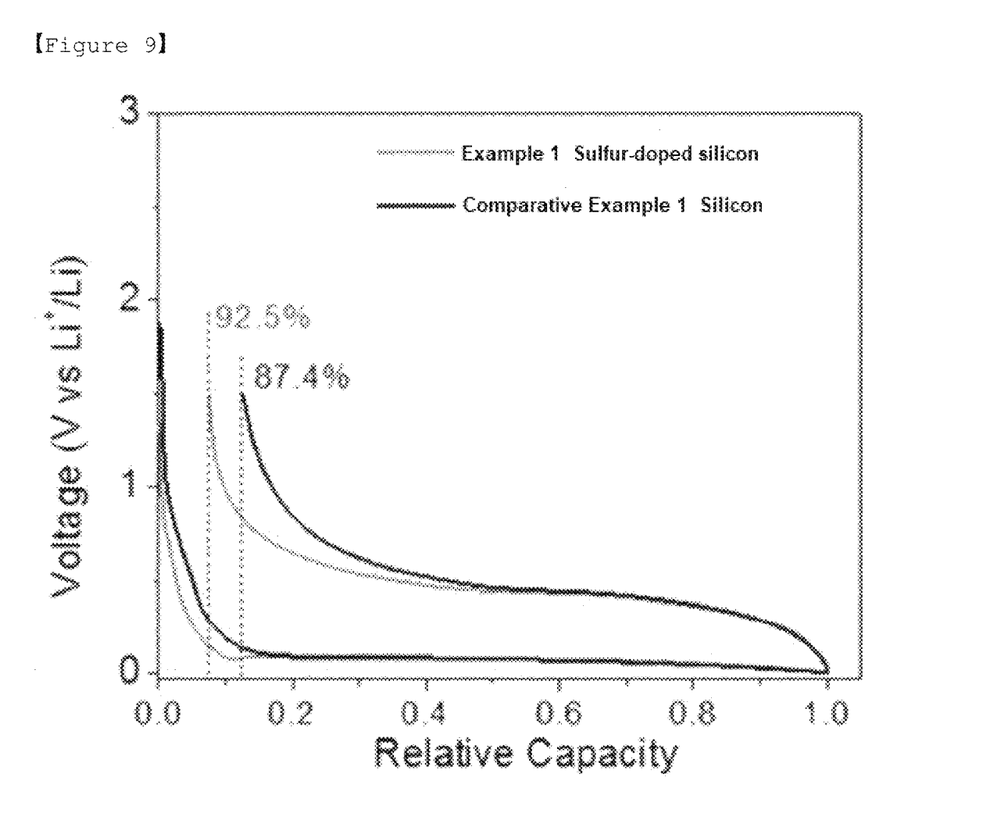
FIG. 9 is initial charging/discharging graphs of the coin batteries prepared in Example 3 and Comparative Example 3.

The charging/discharging (Wonatech, WBCS3000K8) device was used to confirm the initial charging/discharging characteristics of each battery by a constant current method (galvanostatic measurement), and the results are shown in FIG. 9. It can be seen from FIG. 9 that the initial charging/discharging efficiency of the battery prepared in Example 3 of the present invention is better than the battery prepared in Comparative Example 3.

(2) Evaluation of Charging/Discharging Lifetime Characteristics

Figure 10:
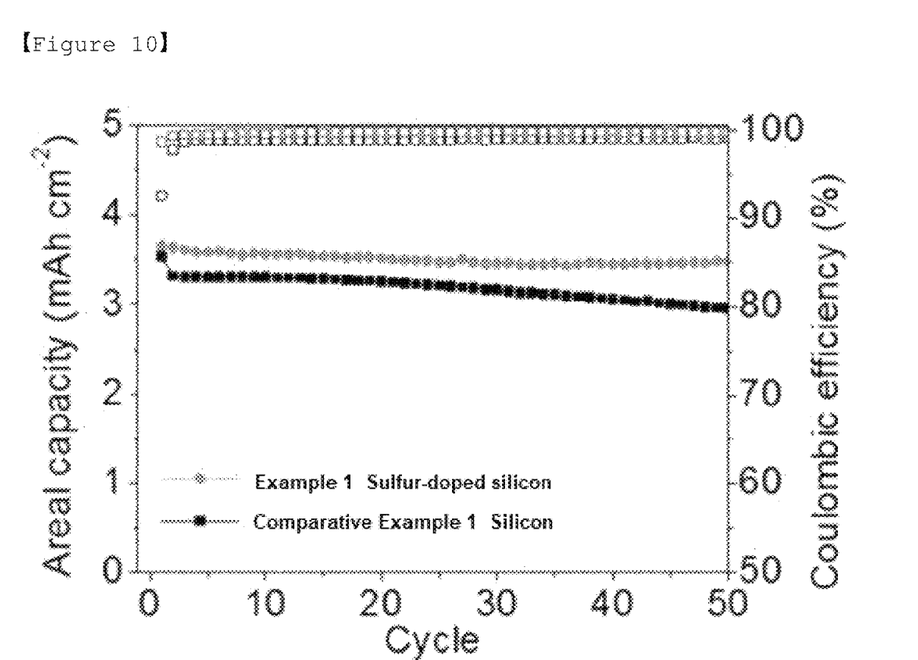
FIG. 10 is graphs showing charging/discharging lifetime characteristics of the coin batteries prepared in Example 3 and Comparative Example 3.

The charging/discharging (Wonatech, WBCS3000K8) device was used to confirm the charging/discharging lifetime characteristics of each battery by a constant current method (galvanostatic measurement), and the results are shown in FIG. 10. It can be seen from FIG. 10 that the charging/discharging lifetime characteristics of the battery prepared in Example 3 of the present invention is better than the battery prepared in Comparative Example 3.

(3) Evaluation of Charging/Discharging Characteristics According to C-Rate

Figure 11:
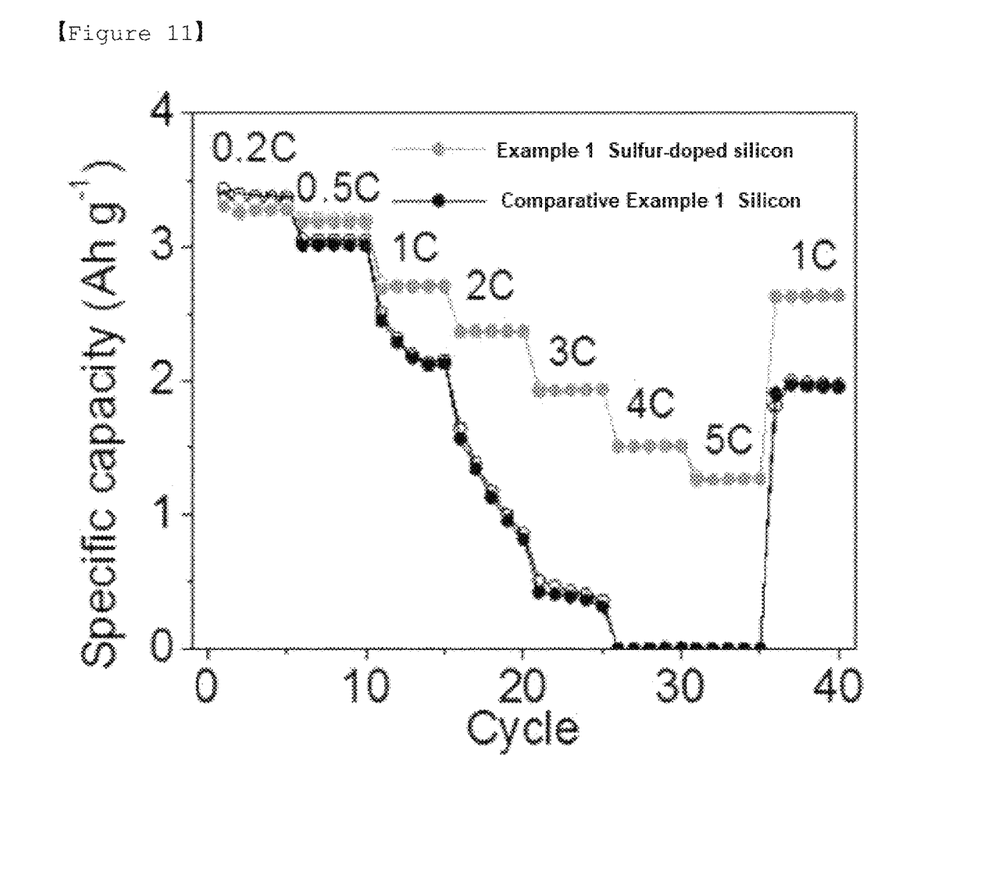
FIG. 11 is graphs showing charging/discharging characteristics according to C-rate of the coin batteries prepared in Example 3 and Comparative Example 3.

The charging/discharging (Wonatech, WBCS3000K8) device was used to confirm the charging/discharging characteristics according to C-rate of each battery by a constant current method (galvanostatic measurement), and the results are shown in FIG. 11. It can be seen from FIG. 11 that the charging/discharging characteristics according to C-rate of the battery prepared in Example 3 of the present invention is better than the battery prepared in Comparative Example 3.

The invention claimed is:

1. A sulfur-doped silicon negative electrode material which has an internal pore channel having an average width of 500 nm to 3 μm and has an average external diameter of 1 μm to 5 μm,
   wherein the sulfur-doped silicon negative electrode material consists of silicon and sulfur seeds and has a structure in which silicon and sulfur seeds are agglomerated with each other in a mixed state, and
   wherein the sulfur-doped silicon negative electrode material has an electrical conductivity of 1 S/m to 6 S/m.

2. The sulfur-doped silicon negative electrode material according to claim 1, wherein the internal pore channel has a shape formed by sulfur-doped silicon particles.

3. The sulfur-doped silicon negative electrode material according to claim 1, wherein the sulfur-doped silicon negative electrode material is a material doped with sulfur, and
   wherein the sulfur is doped in an amount of 0.1 at % to 5 at %.

4. The sulfur-doped silicon negative electrode material according to claim 1, wherein the sulfur-doped silicon negative electrode material has a lithium ion diffusion coefficient of $10^{-12}$ cm$^2$/s to $10^{-10}$ cm$^2$/s.

5. The sulfur-doped silicon negative electrode material according to claim 1, wherein the sulfur-doped silicon negative electrode material has a porosity of 4% to 10%.

6. A method for preparing the sulfur-doped silicon negative electrode material of claim 1 comprising the steps of:
   (a) preparing a mixture by mixing silica, a metal reducing agent, a metal halide salt, and a sulfate compound; and
   (b) performing a reduction reaction on the mixture.

7. The method for preparing the sulfur-doped silicon negative electrode material according to claim 6, wherein in step (a), silica, the metal reducing agent, the metal halide salt, and the sulfate compound are mixed in a weight ratio of 5-14:12-14:62-67:7-19, respectively.

8. The method for preparing the sulfur-doped silicon negative electrode material according to claim 6, wherein in step (b), the reduction reaction is performed by heating the mixture to a temperature in a range of 200° C. to 270° C. under an inert atmosphere.

9. The method for preparing the sulfur-doped silicon negative electrode material according to claim 6, wherein in step (a), the sulfate compound is at least one selected from the group consisting of $MgSO_4$, $ZnSO_4$, $BaSO_4$, $Na_2SO_4$, and $NiSO_4$.

10. The method for preparing the sulfur-doped silicon negative electrode material according to claim 6, wherein in step (a), the metal reducing agent is at least one selected from the group consisting of Mg, Al, Ca, and Zn, and the metal halide salt is at least one selected from the group consisting of $AlCl_3$, $MgCl_2$, and $ZnCl_2$.

11. The method for preparing the sulfur-doped silicon negative electrode material according to claim 6, further comprising a step of:
   (c) dispersing the mixture in water to remove unreacted metal halide salt and sulfate compound after the reduction reaction of step (b) is completed.

12. The method for preparing the sulfur-doped silicon negative electrode material according to claim 11, further comprising a step of:
   (d) removing the metal reducing agent and residual material by treating the mixture with an aqueous hydrochloric acid solution after performing step (c).

13. The method for preparing the sulfur-doped silicon negative electrode material according to claim 6 further comprising a step of: removing unreacted silica which is carried out using 0.1% to 10% (v/v) hydrofluoric acid after performing step (b).

14. A negative electrode for a lithium secondary battery comprising the sulfur-doped silicon negative electrode material of claim 1.

15. A lithium secondary battery comprising the negative electrode for the lithium secondary battery of claim 14.

* * * * *